Feb. 25, 1941.  W. M. SCHWEICKART ET AL  2,233,085
CONVEYING APPARATUS
Original Filed Aug. 28, 1937  2 Sheets-Sheet 1
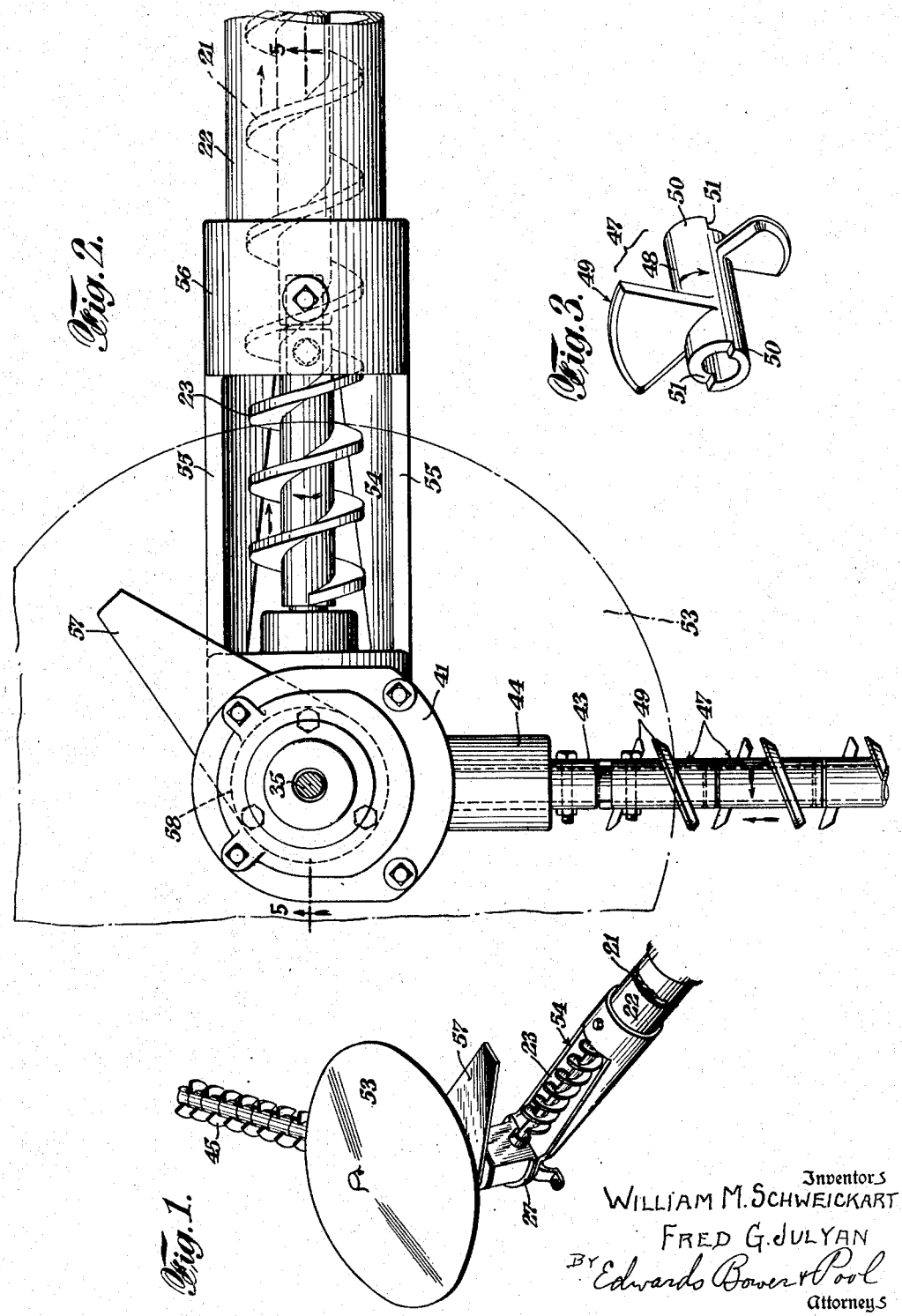
Inventors
WILLIAM M. SCHWEICKART
FRED G. JULYAN
BY Edwards Bower & Pool
Attorneys

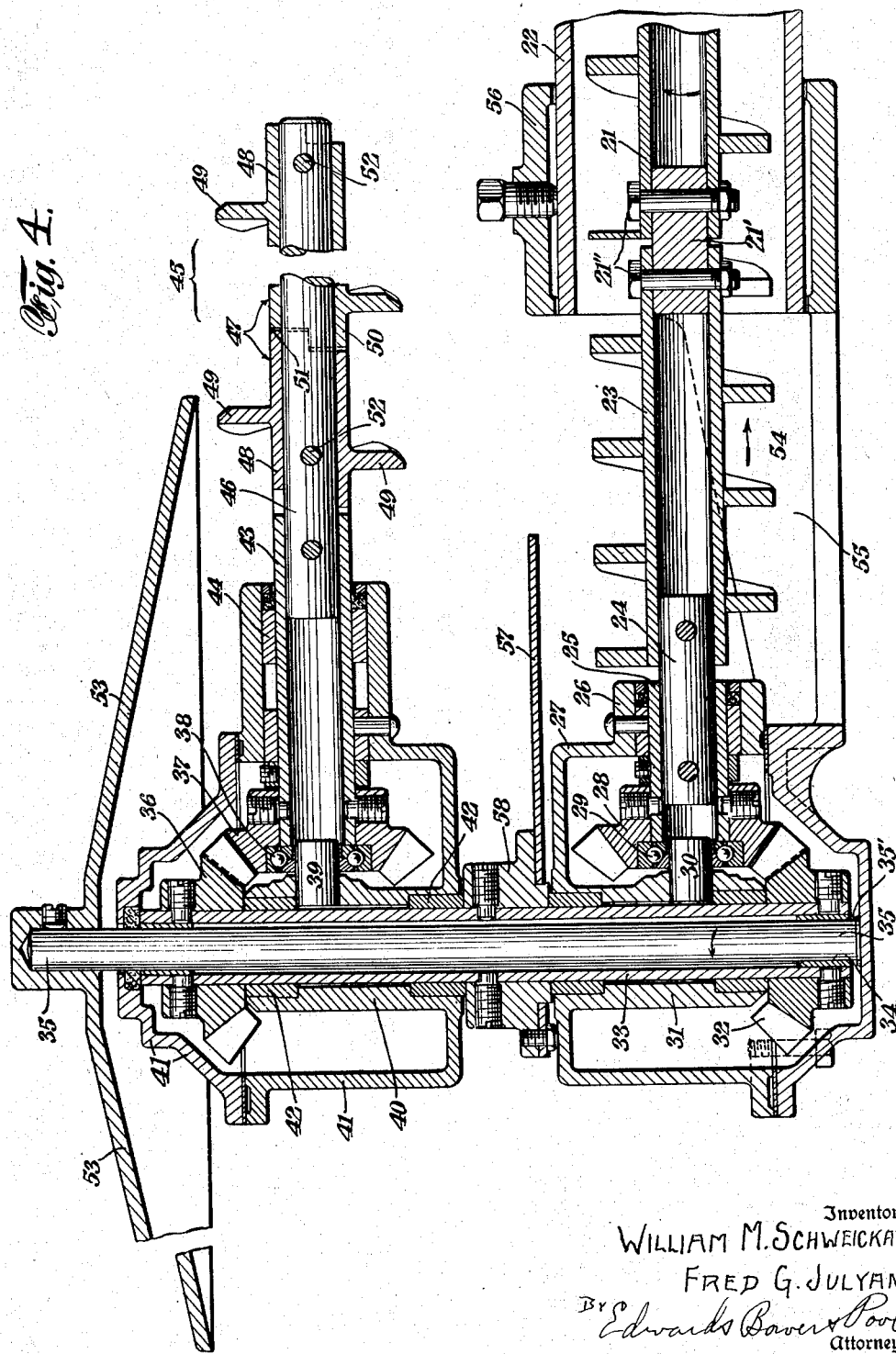

Patented Feb. 25, 1941

2,233,085

UNITED STATES PATENT OFFICE 2,233,085

CONVEYING APPARATUS

William M. Schweickart and Fred G. Julyan, Euclid, Ohio, assignors, by mesne assignments, to Pocahontas Fuel Company, Incorporated, New York, N. Y., a corporation of Virginia Original application August 28, 1937, Serial No. 161,494. Divided and this application February 23, 1938, Serial No. 191,948

8 Claims. (Cl. 198—64)

This invention relates to improvements in apparatus for collecting and conveying coal and the like, and is particularly directed to a system operable beneath an accumulation of coal for transferring the coal from a substantial area to the inlet of a conveyor system. It is particularly suitable for operation in a coal bin to provide a constant and dependable supply of coal to a conveyor preferably of the worm or screw type, which feeds the coal to a furnace.

In installations of this type, proper feeding of the coal is highly important for the purpose of assuring proper burner operation, for economy in driving the feed screws, and to avoid the jamming of the feed which has heretofore been a prolific source of trouble in apparatus of this type. A feature of the present arrangement involves keeping the coal feed tube to the burner substantially less than full of coal, and preferably about half full.

A purpose of the invention is to provide uniform conditions of feed to the main conveyor regardless of the depth of coal. A further object is to provide an effective, dependable and rugged arrangement that will provide a uniform, steady supply of coal regardless of variable conditions in the coal pile and the presence of unusual obstructions such as tramp material in the coal. A more specific object is to supply a device for collecting coal from a substantial area that will avoid the bridging of the coal and which is not subject to breakage when encountering foreign material.

Other objects and advantages of the invention will appear from the following description considered in connection with the accompanying drawings, in which, Fig. 1 is a perspective view of the entire assembly;

Fig. 2 is a plan view of the collector unit with the the top shield removed;

Fig. 3 is a detail of a collector blade section; and

Fig. 4 is a vertical longitudinal section on line 4—4 of Fig. 2 with the collector arm and impeller in alignment with the feed screw.

The coal collector unit is adapted to be mounted in a coal bin and has a rotating collector arm differentially rotating and swinging to gather and draw the coal to a feed pocket at the end of the coal feed tube. The bin collector unit is driven from the main coal feed screw 21 rotating in the coal feed tube 22 and having a suitable drive connection with a vertical rotating drive sleeve 33 carrying a planetary drive for the collector arm. In the form illustrated, the tubular end of feed screw 21 is coupled to pickup screw section 23 in appropriate manner, as by connecting shaft 21' fitting into the hollow ends of the preferably tubular shafts of feed screw 21 and pickup screw 23, and held in place by bolts 21''.

Screw section 23 is constructed to feed at a substantially slower rate than the main feed screw 21, as by employing a pickup screw 23 slightly more than half the pitch of screw 21. Pickup screw 23 is coupled at its other end to connecting shaft 24 pinned to sleeve 25, journaled in bearing 26 in the base housing 27, carrying bevel gear 28 rotatably supported through ball bearing 29 and pivot stud 30 on hub sleeve 31 extending downwardly from the upper face of the base housing 27.

Bevel gear 28 meshes with bevel gear 32 on vertical drive sleeve 33 journaled in hub 31 and maintained by spacer rings 34 in spaced relationship to the vertical disc-supporting standard 35 rotatably swiveled at 35' on the bottom of housing 27 which in turn rests on the floor of the bin.

A bevel gear 36 for driving the collector arm is mounted on the upper part of drive sleeve 33 and meshes with the collector arm bevel gear 37 mounted through ball race 38 and pivot stud 39 on hub 40 extending upwardly from the bottom of upper housing 41 rotatably mounted on the sleeve 33. Hub 40 is journaled on sleeve 33 through bushings 42, and bevel gear 37 is mounted on connecting sleeve 43 journaled in a suitable bearing 44 in the upper housing 41. The coal collector arm 45 is carried by sleeve 43 and extends outwardly into the coal storage zone, being provided with suitable projections adapted to impel the coal toward the center of the collector unit when the collector arm is rotated by gear 37. The arm 45 comprises a shaft 46 mounted in sleeve 43 and carrying suitable helically positioned coal-impelling elements 47.

This outrigger screw has its impeller or paddle sections 47 interrupted so as to deliver a fixed amount of coal at each revolution until its discharge end is restricted when the screw will slip without jamming. This is necessary in order to protect the space beneath the collector cover against filling too deeply or packing too tightly. The pickup flight of the feed arm 45 is also interrupted in order that it may pick at the wall of coal against which it is working and not smoothly slide thereon in normal operation. Another characteristic of this interrupted screw is that it will crush lumps and convey lumps without arching.

The collector screw is built up of a series of paddle impeller sections 47 each comprising a tubular hub 48 fitting shaft 46 and provided with opposed longitudinally spaced helically arranged collector paddles 49, as shown best in Fig. 3. The hubs 48 are provided with interlocks, such as tongues 50 and recesses 51, and the terminal sections 47 are held in place by removable pins 52, facilitating the rearrangement and replacement of any of the paddle sections 47.

The shield 53 located above the collector unit supports the coal overlying the unit, being rotatably sustained by the standard 35 which transmits the weight of the coal to the base without imposing any load on the collector drive mechanism.

A coal pocket 54 is provided at the end of the coal feed screw 21 and may be formed between pocket plates 55 integral with the base housing 27 and extending on either side of a pickup screw section 23 to integral mounting collar 56 adjustably clamped to the end of the coal feed tube 22.

To impel coal to the coal pocket at the entrance of tube 22, operative regardless of the circumferential position of the collector arm 45, a blade 57 is mounted on sleeve 33 and rotates between housings 41 and 27 to stir and move to said pocket coal located beneath disc 53. This impeller blade 57 is mounted on collar 58 attached to drive sleeve 33.

This coal collector unit is adapted for location in a coal bin. It is designed to be covered to any depth with the coal, and will remove the coal completely from an inverted frusto-conical space whose base is the path of the collector arm. While suitable walls and bottom may be provided in the bin around this space, the collector is adapted for use in an ordinary bin in which the space from which coal is not removed by the collector may be filled by a reserve supply of the fuel. The collector is likewise adapted for location either on the floor of the bin or in sunken position.

Disc 53 maintains the space beneath it largely free from coal, due to the proper dimensioning of the shield in relation to the normal angle of repose of the coal and its bridging tendency. It therefore provides uniform feed conditions regardless of the quantity of coal that may be in the bin.

The collector arm drive imparts both a revolving and a planetary impulse; but the employment of friction bearings 42, in conjunction with the ball bearings 38 assures the planetary movement and avoids any tendency for the drive impulse to be exerted solely in revolving the collector arm about its axis. The arm consequently impels the coal inwardly under the disc 53, the paddles 49 tending to break up lumps of soft coal, to force out of their path particles of foreign matter, and preventing any tendency toward bridging or formation of a bridging or channeling. The rotating collector housing 41 is encouraged to advance by its frictional engagement with supporting hub 58 and sleeve 33 through spacers 42. The direction of planetary rotation of the collector arm 45 is properly correlated with the direction of revolution of the arm about its axis so as to cause the top of the arm to travel in the direction of the planetary rotation. It has been found that when this relationship is maintained, the action of paddles 45 assists materially in obtaining proper planetary movement. This result involves the use of interrupted flights on the collector arm which produces a tractive effect that cooperates with the operation of the arm in the proper direction as indicated to cause the collector to dig into the coal.

Therefore there will be a tendency in operation for the collector arm to have a slow planetary movement when entirely embedded in the coal; but the feed of the coal will be efficacious whether the arm remains in one position until all coal reaching that position by gravity is removed, or whether the arm continuously travels about the collector axis. If, however, a serious obstruction is encountered the arm will remain in position and remove all coal which reaches it by gravity, thereby clearing a space which will be serviceable in dislodging the obstruction.

Coal impelled beneath disc 53 will tend to travel by gravity into the coal feed pocket 54; and when accumulated at a point circumferentially spaced from the pocket, its travel to the pocket will be assisted by the impeller blade 57, which not only serves to facilitate the flow of the coal by slicing under accumulations thereof, but which also exerts a certain impelling and conveying effect. The blade 57 moving in a horizontal plane around the top of the base housing 27 will slide under the surrounding mass of material and move it in the direction of movement of the blade as the blade approaches the space above the pickup screw 23 so that some of the material collected in by the action of the collector screw will be moved toward the pickup screw by the impeller blade. The relatively long interval between successive passes of blade 57 prevents the accumulation above the blade of larger pieces of coal whose travel into pocket 54 may be impeded by a rotary conveying device having inadequate spaces above the pocket and blade 57 is likewise adapted to slice through wet coal to prevent packing thereof.

All of the screw parts picking up the coal from the bin and delivering it to the feed screw 21 are retained under tension in operation, preventing bucking of the sections and keeping all of the connections under tension. In the picking up of the coal the bin collector screw and its support have a tendency to advance into the coal due to the support of the rotating collecting housing by the rotating hub 58 of the slicer plate 57 and also due to the reaction of the helical blades of the collector itself. Apparently the blades in the lower part of their travel encounter greater resistance than during the upper half of their travel around the axis of the collector arm. This is probably due not only to the greater static head but also to the greater density of the lower layers of the coal and the tendency of the coal to pack below the collector arm, whereas the upper layers are free to lift and shift more readily under the action of the blades.

The direction of rotation of this collector is such with relation to the normal tendency of the drive that the feeding reaction on the collector screw urges it forward in the direction of rotation of the vertical shaft 33 and the hub 58 and the upper housing 41. Therefore, the collector arm is urged into the coal by the frictional torque of the drive and also by the tendency of the collector blades to feed the arm forward in the same direction, these two forces being always additive and never opposing. These combined forces exert a constant effort to feed the collector screw into the coal and at the same time the interrupted formation of the screw blades avoids any packing of the coal in arched formation around the collector. A collector screw with a continuous helical periphery often has a tendency to continuously and smoothly pack the comminuted material in the form of a cylindrical arc which forms a bearing for the screw periphery and prevents the material from entering between the convolutions of the screw to be fed thereby. With the separate screw blades 49, the coal is thus picked up in sections and moved inward to the space beneath hood 53. The hood or collector cover 53 is independently supported by the shaft 35 resting on the floor of the base housing and transmitting the vertical weight of the coal on the hood directly to these base parts.

This case is a division of application Serial No. 161,494 filed August 28, 1937.

We claim:

1. Collecting and conveying apparatus for comminuted material comprising a conveyor tube adapted to extend into a bin or the like and having at its inner end an open space of axial length greater than the radius of the tube, a conveyor screw extending through said tube and having its end in material-receiving position in said open space and adapted to move material from said space at a predetermined rate, a housing at the inner end of said conveyor screw carrying a rotatable collector arm, means in said housing for driving said collector arm from said feed screw, a shield above the inner end of said collector arm and overhanging the inner end of said collector screw and acting to prevent the material from filling in above said open space, and feed means carried by said collector arm and operated by the rotation thereof to move material inward under said shield at a predetermined rate less than the rate of feed of said conveyor screw, said shield and collector arm and conveyor screw cooperating to automatically maintain said open space clear of excess material and to avoid jamming and packing of material under the shield.

2. Apparatus as set forth in claim 1 in which a blade device is mounted to rotate around a vertical axis and to pass intermittently through the free space between the inner ends of the feed screw and collector arm so as to move material into said space and avoid arching of material under said shield.

3. Apparatus as set forth in claim 1 in which the inner end of the feed screw is formed to feed material at a slower rate than the portion of said feed screw within the conveyor tube so that the material in said tube is fed at a faster rate than the supply and only partly fills said tube.

4. Apparatus for collecting and conveying comminuted material comprising a conveyor screw and tube adapted to be positioned at the bottom of the bin or the like and having at its inner end a housing carrying a rotatable collector screw, of a shield device over said housing and independently rotatable with relation thereto so that torque applied to the shield may rotate the shield without rotating said housing and said housing may be rotated without rotating the shield.

5. In apparatus for collecting and conveying material from a bin or the like having a floor or bottom, the combination with a conveyor tube and screw above said floor or bottom, of a vertical shaft member rotated by said screw, a housing rotatably mounted on said shaft and carrying a collector arm device journaled in said housing and extending outward above and spaced from said floor or bottom, a series of separate helically inclined blades on said arm adapted to feed material inward toward said housing upon rotation of said arm around its axis, gear means in said housing comprising a driving gear on said shaft and a driven gear on said arm coacting to drive said collector arm from said vertical shaft member in a direction such that the tips of the collector arm blades at the upper portion of their rotation around the axis of the arm move through said material in the direction of rotation of said vertical shaft, said blades acting to cut into the material at separate points above said floor or bottom as the housing and arm pivot around the vertical axis of the housing and applying a force tending to urge the arm in the direction of rotation of said shaft.

6. Collecting and conveying apparatus as set forth in claim 5 in which the gear means between the vertical shaft member and the collector arm comprises an upper horizontal bevel gear on the vertical shaft and an intermeshing lower bevel gear on the collector arm.

7. Collecting and conveying apparatus for comminuted material comprising a conveyor tube adapted to extend into a bin or the like along the floor thereof and having at its inner end an open space for the reception of material from the bin, a conveyor screw in said tube and having its end in material-receiving position in said open space, a bracket fastened to said tube and resting on said floor of said bin and carrying at its inner end a housing provided with a tubular portion, a vertical shaft journaled in said tubular portion, a collar member on said shaft and rotatably resting on said housing, an upper housing journaled on said shaft and rotatably resting on said collar member so as to be spaced from said floor, a rotatable collector arm supported by said upper housing above said floor and adapted to gather material and feed it into said open space, and driving means between said conveyor screw and the collector arm rotating said arm, the weight of said arm and upper housing being transmitted through said collar member and said lower housing to the floor of the bin.

8. Collecting and conveying apparatus as set forth in claim 7 in which the collar member is fixed to the vertical shaft and carries a stirrer in the form of a blade lying flatwise in a plane under the collector arm and over the open space for the reception of material from the bin.

WILLIAM M. SCHWEICKART.
FRED G. JULYAN.